United States Patent
Jambor et al.

[11] Patent Number: 5,975,620
[45] Date of Patent: Nov. 2, 1999

[54] PASSENGER CAR HAVING A LOWERABLE VEHICLE ROOF

[75] Inventors: Arno Jambor, Vaihingen; Oliver Wagner, Filderstadt, both of Germany

[73] Assignee: DaimlerChrysler AG, Germany

[21] Appl. No.: 08/918,107

[22] Filed: Aug. 27, 1997

[30] Foreign Application Priority Data

Aug. 27, 1996 [DE] Germany .............................. 196 34 507

[51] Int. Cl.$^6$ .................. B60J 7/047; B60J 7/08; B60J 7/185
[52] U.S. Cl. ................ 296/108; 296/107.17; 296/220.01
[58] Field of Search ........................... 296/107.17, 107.2, 296/216.04, 216.05, 220.01, 108, 216.03

[56] References Cited

U.S. PATENT DOCUMENTS

| | | | |
|---|---|---|---|
| 5,078,447 | 1/1992 | Klein et al. | 296/107.2 |
| 5,195,798 | 3/1993 | Klein et al. | 296/146 L |
| 5,265,930 | 11/1993 | Klein et al. | 296/107.17 |
| 5,558,388 | 9/1996 | Furst et al. | 296/107 |
| 5,769,483 | 6/1998 | Danzl et al. | 296/107 |

FOREIGN PATENT DOCUMENTS

| | | | |
|---|---|---|---|
| 42 03 228 C2 | 6/1994 | Germany . | |
| 4203299 | 6/1994 | Germany | 296/107 |
| 42 03 229 C2 | 7/1994 | Germany . | |
| 4326329 | 9/1994 | Germany | 296/107 |
| 43 26 292 C2 | 2/1995 | Germany . | |
| 4435222 | 11/1995 | Germany | 296/107 |
| 195 39 086 C1 | 10/1996 | Germany . | |

*Primary Examiner*—D. Glenn Dayoan
*Assistant Examiner*—Paul Chenevert
*Attorney, Agent, or Firm*—Evenson, McKeown, Edwards & Lenahan, P.L.L.C.

[57] ABSTRACT

A passenger car has a roof which can be lowered in a rearward vehicle structure of the vehicle body. Each lateral roof frame part is foldably connected with the rearward roof area by way of a hinge arrangement. A securing device for fastening in the respective end position is assigned to an operative position of the roof frame parts in which these project toward the front as well as to an inoperative position in which these are folded in.

8 Claims, 5 Drawing Sheets

PASSENGER CAR HAVING A LOWERABLE VEHICLE ROOF

BACKGROUND AND SUMMARY OF THE INVENTION

This application claims the priority of 196 34 507.3, the disclosure of which is expressly incorporated by reference herein.

The present invention relates to a passenger car having a vehicle roof which can be lowered into a rearward structure of the vehicle body and which has a rearward roof area. Two lateral roof frame parts project from the rearward roof area in the longitudinal direction of the vehicle toward the front and flank and guide a roof part arrangement which can be moved between an opened and a closed end position in the longitudinal direction of the vehicle.

DE 42 03 228 C2 describes a passenger car having a vehicle roof which can be lowered into a rear of the vehicle body and which is provided with a stable rearward roof part and two stable lateral roof frame parts which project from the rearward roof part in the longitudinal direction toward the front and which laterally flank and guide a folding roof. The rearward roof part and the lateral roof frame parts are carried by B-columns and C-columns which are swivellably linked to the vehicle body. Lateral parts project downward from the rearward roof part in the area of the C-columns and are configured of a flexible material so as to be foldable. The B-columns and C-columns form a four-bar device for displacing and lowering the vehicle roof into a storage space in the rearward vehicle structure. As an alternative, when the vehicle roof is closed, only the folding roof can be changed into its open end position. In the lowered condition, the vehicle roof requires a relatively large space.

The Mercedes SLK Roadster has a lowerable vehicle roof as a two-part hardtop, in which the two hardtop parts can be folded together about a folding axis which extends above a rear window transversely to the longitudinal direction of the vehicle and horizontally. The roof can be lowered by corresponding kinematics in the rearward vehicle structure.

It is an object of the present invention to provide a passenger car which has a vehicle roof which can be changed into variable opening conditions while the safety and the comfort are simultaneously increased, and which requires a comparatively small storage space for the vehicle roof in its opening position.

This object has been achieved according to the present invention by providing that each lateral roof frame part is foldably connected with the rearward roof area by way of a hinge arrangement. A securing device for fixing the respective end position is associated with an operating position of the roof frame parts in which these project toward the front as well as to an inoperative position in which these are folded in. Thereby, the lateral roof frame parts, which otherwise conventionally project in a space-consuming manner from the rearward roof area, are folded toward the interior in a simple manner for the opening position. This results in a significantly reduced required depositing space, particularly with respect to the axial length, within the vehicle body.

The folding-in of the lateral roof frame parts, the vehicle roof, in its opening position, achieves a compact size. The integration of a movable roof part arrangement into the vehicle roof, which can be constructed as a lamella roof arrangement or as a folding roof arrangement, allows the vehicle interior to be changed into a comfortable opening condition even when the vehicle roof is closed.

With its rearward roof area and the lateral roof frame parts, the vehicle roof constitutes a one-part hardtop whose stability provides sufficient protection against break-ins or vandalism, increased safety with respect to intrusions in an accident, a noise and heat insulation which is improved in comparison to fabric tops and a suitability for car wash installations which is increased in comparison to fabric tops. Nevertheless, the movable roof part arrangement achieves an increased functionality because also, when the hardtop is closed, an opening condition for the vehicle interior can be achieved. In addition to being configured as a lamella roof or as a folding top, the roof part arrangement may also be constructed as a firm-lifting or a sliding roof.

As a further aspect of the present invention, the hinge arrangements of the roof frame parts are positioned on the rearward roof area at a distance from an outer contour of the roof part arrangement moved into an opening position such that the roof frame parts are arranged in an inoperative position folded in at a right angle with respect to the roof center in parallel in front of the outer contour of the roof part arrangement. This is particularly advantageous and space-saving because the roof frame parts are folded toward the interior into the area which has been vacated by the roof part arrangement displaced or moved into its opening position.

According to a yet further aspect of the present invention, each roof frame part can be folded at a right angle toward the roof center to the inside. The hinge arrangements of the two roof frame parts are arranged in a mutually offset manner in the longitudinal direction of the vehicle such that the roof frame parts in their inoperative position are positioned parallel, i.e. side-by-side in the transverse direction of the vehicle. Because the roof frame parts are not aligned with one another in the transverse direction of the vehicle but are offset with respect to one another, i.e., can be positioned behind one another in the longitudinal direction of the vehicle, the roof frame parts can have an increased axial length which simultaneously also provides a longer guide for the movable roof part arrangement. Consequently, when the roof part arrangement is open, a relatively large roof opening is exposed which offers a large opening condition for the vehicle interior.

According to a further modification of the present invention, the rearward roof area has two C-columns which are pulled in a wing-type manner toward the rear in the longitudinal direction of the vehicle. At the beginning of the wing-type course, the C-columns lead into two cross members which are arranged at a distance above one another at least approximately at the same axial level and extend along the width of the vehicle roof. The cross members frame a rigid rear window which extends steeply with respect to a horizontal plane. The entire rearward roof area constitutes a firm component, so that the C-columns also have a correspondingly stable configuration. The wing-type course of the C-columns in the longitudinal direction of the vehicle toward the rear and the simultaneous steep arrangement of the rear window already at the beginning of the wing-type course provide a clearance between the wing-type areas of the C-columns. When the vehicle roof is lowered into the rearward vehicle structure, this clearance offers an additional storage volume and thus an enlarged trunk.

A further aspect of the present invention is the movable roof part arrangement being configured as a lamella roof. The lamella roof parts, in a pushed-together opening condition, including lateral guides, can be swivelled about a swivelling axis, which extends horizontally and transversely to the longitudinal direction of the vehicle, toward the rear to the rearward roof area into a deposited position. A detent for securing the lamella roof in the rearward roof area is associated with the depositing position of the lamella roof. Swivelling of the lamella roof from its displacement plane to the rear toward the rearward roof area arranges the hinge arrangements for the roof fame parts still farther toward the rearward roof area and thus further reduces the axial size of, the vehicle roof in the folded-in condition of the roof frame parts.

In a further embodiment of the present invention, the lamella roof is provided with a drive transmission unit which has at least one coupling member which compensates for the swivel movement of the lamella roof parts between the open end position and the depositing position. As a result, the drive transmission unit, during the swivelling of the lamella roof parts into its depositing position which is inoperative, must not be separated from the lamella interconnection of the lamella roof parts so that, with repeated swivelling of the lamella composite into its operating position, the lamella roof can be operated again without significant expenditures by a corresponding drive.

Furthermore, the hinge arrangements can have axially symmetrically configured and installable lifting/swivelling hinges which, in a constructionally identical manner, can be used for left and right roof frame parts. This advantageously reduces the expenditures for the manufacturing and assembly of the vehicle roof.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
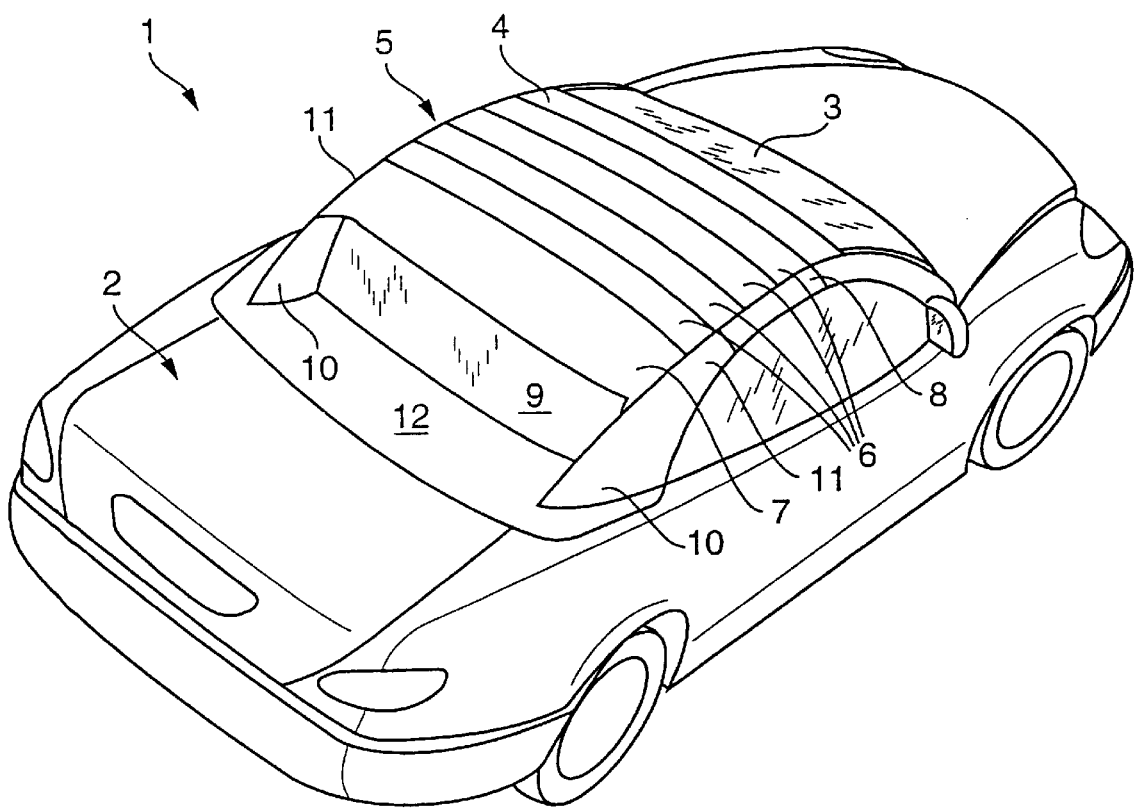
FIG. 1 is a perspective view of an embodiment of a passenger car according to the present invention with a completely closed vehicle roof.

A passenger car 1 shown in FIGS. 1 to 11 has a stable vehicle roof 5 in the form of a hardtop which is arranged between a rearward vehicle structure 2 and a windshield frame 4 which frames and bounds an upper edge of a windshield 3. The windshield 3 is laterally framed by two A-columns which represent parts of the vehicle body structure. The vehicle roof 5 can be lowered completely into the rearward vehicle structure 2 in the below described manner.

The vehicle roof 5 has a firm rearward roof area 7, 9, 10, 11, 12 which is formed as a composite of two lateral C-columns 10, 11, a rearward roof frame 7, a rear window 9 and a plate-shaped covering area 12. Two cross members can be arranged in the rearward roof frame 7 in a generally known manner and at the level of the covering area 12, to frame the top and bottom of rear window 9. In the closed condition of the vehicle roof 5, the covering area 12 closes a vehicle body opening through which the vehicle roof 5 can be lowered and can be housed in a trunk of the rearward vehicle structure 2.

The firm or stable rear window 9 is aligned relatively steeply between the C-columns 10, 11 on each side of the vehicle, which form wing-type courses 10' extending in the longitudinal direction of the vehicle toward the rear. Between the wing-type courses 10' of the C-columns 10, 11, a clearance remains which is bounded toward the front by the steeply set rear window 9.

The one-piece composite of the rearward roof area, as an extension of column stubs 11' of the C-columns 10, 11, is adjoined in the longitudinal direction of the vehicle toward the front by two lateral roof frame parts 8 which, in the closed condition of the vehicle roof 5, lead into the A-columns of the vehicle body supporting structure. The lateral roof frame parts 8 are held in a stable manner on the C-columns by hinge arrangements 13, 14, 15 as described below with reference to FIG. 9.

In their operating position illustrated in FIGS. 1 to 4 and 8, 10, the lateral roof frame parts 8 bound a roof opening of the vehicle roof 5 which is used for receiving a lamella roof 6. In the longitudinal direction of the vehicle toward the rear, the roof opening is bounded by the rearward roof frame 7. In the longitudinal direction of the vehicle toward the front, the roof opening of the roof 5 is open, but in the closed condition of the vehicle roof 5, is bounded by the windshield frame 4.

Figure 10:
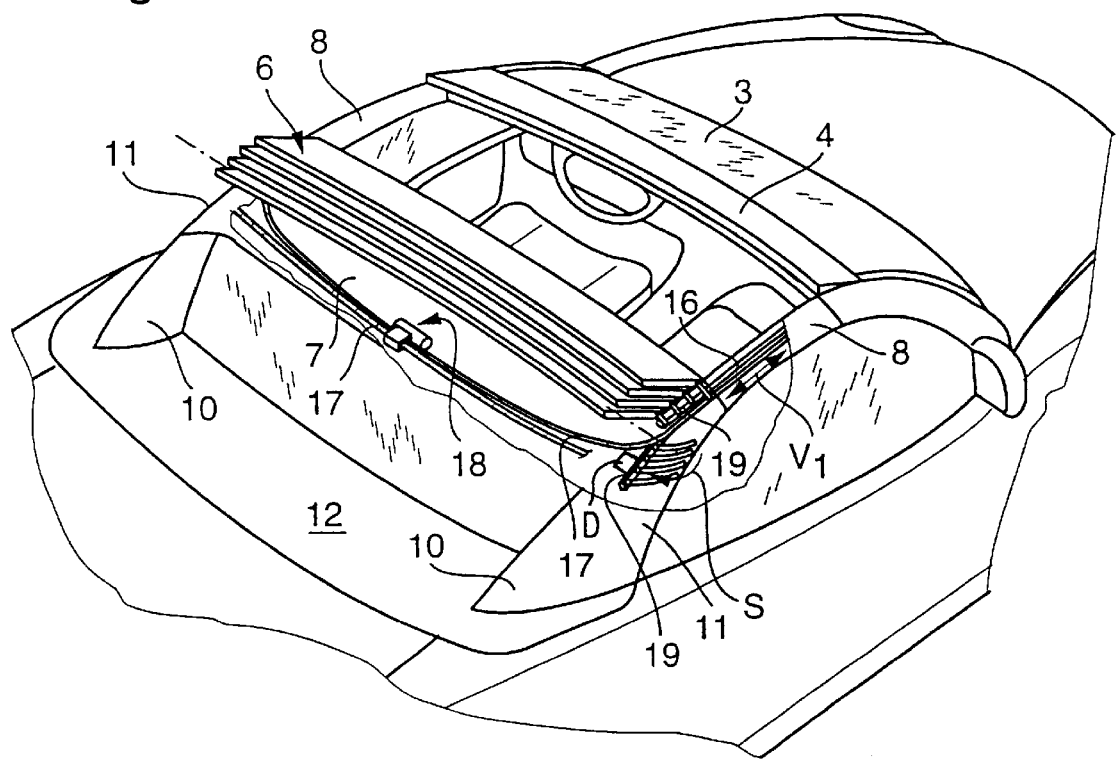
FIG. 10 is an enlarged perspective view of the passenger car according to FIGS. 8 and 9 showing a drive for the lamella roof.

The lamella roof 6 has several lamella roof parts which are each laterally guided in guide rails 16, 19 (FIG. 10). The guide rail sections 16 are fixed on the interior sides of the roof frame parts 8, and the guide rail sections 19 are fixed on the interior sides of the column stubs 11. In the area of the transition between the roof frame parts 8 and the column stubs 11, the guide rail sections 16 and 19 are separated from but aligned with one another.

A wind deflector for the lamella roof 6 is provided on the windshield frame 4 and, at least when the roof is open, projects diagonally upwards. For the opening of the lamella roof 6, the individual lamella roof parts are released from their interconnection, then tilted diagonally upwards and thereafter displaced in the direction of the arrow $V_1$ shown in FIG. 10 toward the rearward roof area. The roof parts are pushed together in a packet-shaped manner in the space remaining between the column stubs 11. A drive is provided for moving the lamella roof parts and, in the illustrated embodiment, is an electric driving motor 18 and two flexible tension-pressure elements 17, e.g. tension pressure rods, which are guided in the guide rail sections 16, 19 and extend below the rearward roof frame 7 to the driving motor 18 positioned approximately in the vehicle center. The tension pressure rods 17 constitute drive transmission elements.

The guide rail sections 16 are stationarily fixed in the roof frame parts 8, whereas the guide rail sections 19 are detachably held on the column stubs 11 about a swivelling axis S (FIG. 10) extending transversely with respect to the longitudinal direction of the vehicle and horizontally. In the pushed-back end position illustrated in FIG. 10, the lamella roof parts 6, including their guide rail sections 19, can be swivelled about the swivelling axis S in the downward and rearward direction under the rearward roof frame 7, in front of the rear window 9, and can be fixed in this deposited position by suitable detents D as shown schematically in FIG. 10. In this inoperative position, the lamella roof parts 6 free the space of the roof opening between the column stubs 11 and create a clearance. In this thus created clearance, the roof frame parts 8 can be folded to the inside in the direction of the roof center by the hinge arrangements so they are aligned in the transverse direction of the vehicle in their inwardly folded inoperative position and sweep over a rectangular swivel angle.

The tension pressure rods 17 are elastically flexibly constructed such that they go along in the swivelling of the guide rail sections 19, including the lamella roof parts of the lamella roof 6, without being damaged. During another swivelling-up of the guide rail sections and of the lamella roof parts into their operative position, automatically the tension pressure rods 17 are therefore also already back in their operative condition.

In order to be able to fold the roof frame parts 8 to the inside, the vehicle roof 5 must first be detached in the area of the forward front edges of the roof frame parts 8 from the windshield frame 4 in that corresponding locks $S_1$, $S_2$ on the roof frame parts 8 and $S_3$, $S_4$ on the frame 4 are unlocked. Subsequently, the entire vehicle roof 5 is swivelled in the direction of the arrow H (FIG. 2) in the upward direction. For this purpose, corresponding swivel bearings are provided on the vehicle body. The remaining kinematics of the movements for the lowering and displacing of the entire vehicle roof 5 into the trunk of the rearward vehicle structure 2 need not be shown as they will be readily discernable by a person skilled in this art. In order to be able to fold the roof frame parts 8, which project freely from the column stubs 11, toward the inside, the roof frame parts 8 are first unlocked and are then, with one lifting cylinder 13 respectively, axially removed so far from the column stubs 11 that the outer contour of each column stub 11 will not stand in the way of the subsequent swivel movement of the respective roof frame part 8 toward the inside.

The piston rod of each lifting cylinder 13 has a swivel hinge 14 so that the hinge arrangement for each roof frame part 8 is constructed as a lifting/swivel hinge. An end stop as well as a corresponding lock are assigned to the swivel hinge 14 to limit the folding movement of the roof frame part 8 to the inside (arrow $K_1$ in FIG. 9) to an angle of 90°. The axial displacement of the roof frame part 8 takes place in the direction of the arrow L.

Figure 9:
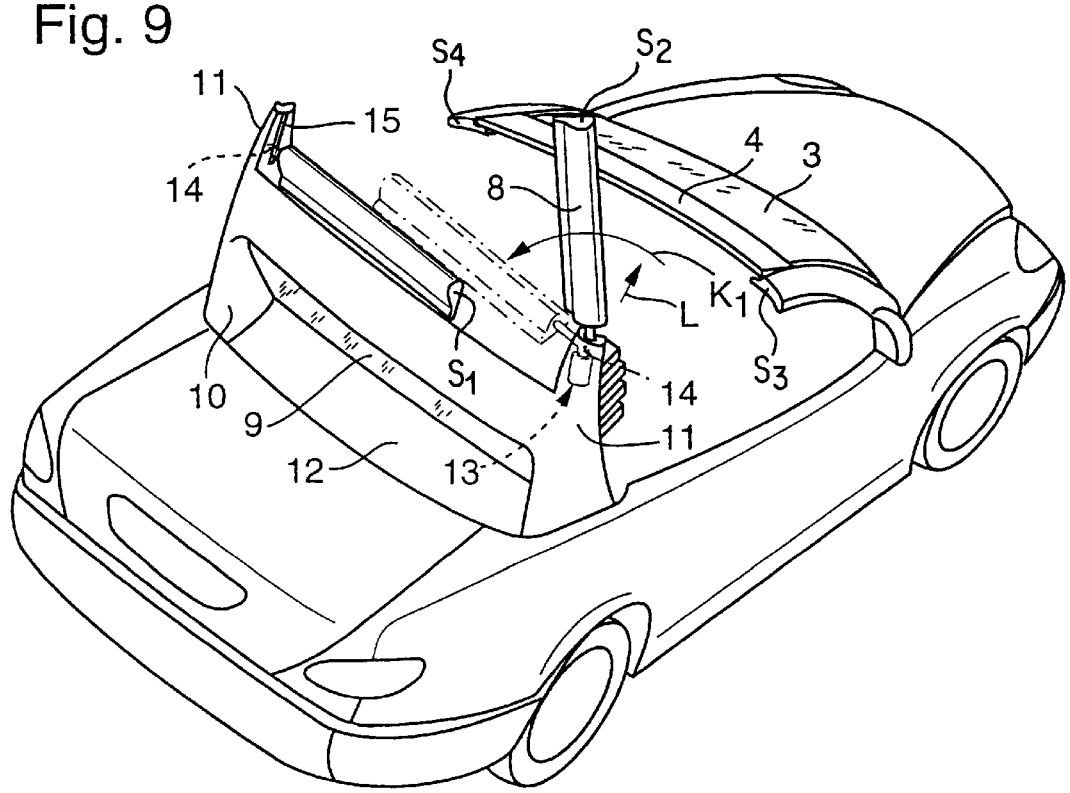
FIG. 9 is a perspective view of the passenger car of FIG. 8, with a rearwardly swivelled vehicle roof whose lateral roof frame parts are folded in toward the inside.

The two roof frame parts 8 have a length which is significantly larger than half the width of the roof opening in the transverse direction of the vehicle. Thus, the two roof frame parts 8 are folded in an offset manner with respect to one another in the longitudinal direction of the vehicle as seen in FIG. 9. For this purpose, the two hinge arrangements 13, 14 are integrated in each column stub 11 also in an axially offset manner. That is, the axial offsetting is adapted to the dimensions of the roof frame parts 8 such that the first folded-in roof frame part directly adjoins the rear-side edge of the roof opening between the column stubs 11, and the other roof frame part 8 comes to rest on the first roof frame part 8 as seen by the dot-dash line in FIG. 9. In order to permit the swivelling of the roof frame parts 8 to the inside, guide slots 15 are provided in the interior sides of the column stubs 11 facing the roof opening.

Figure 8:
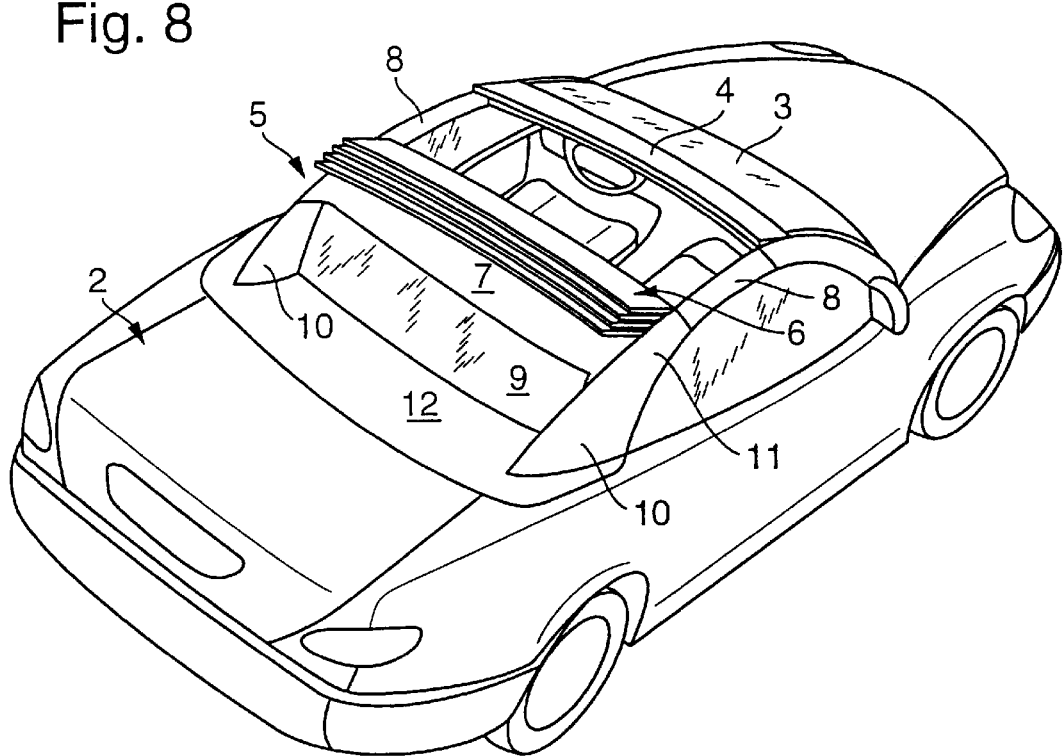
FIG. 8 is a perspective view of the passenger car similar to FIG. 1 but with an opened lamella roof.
Figure 11:
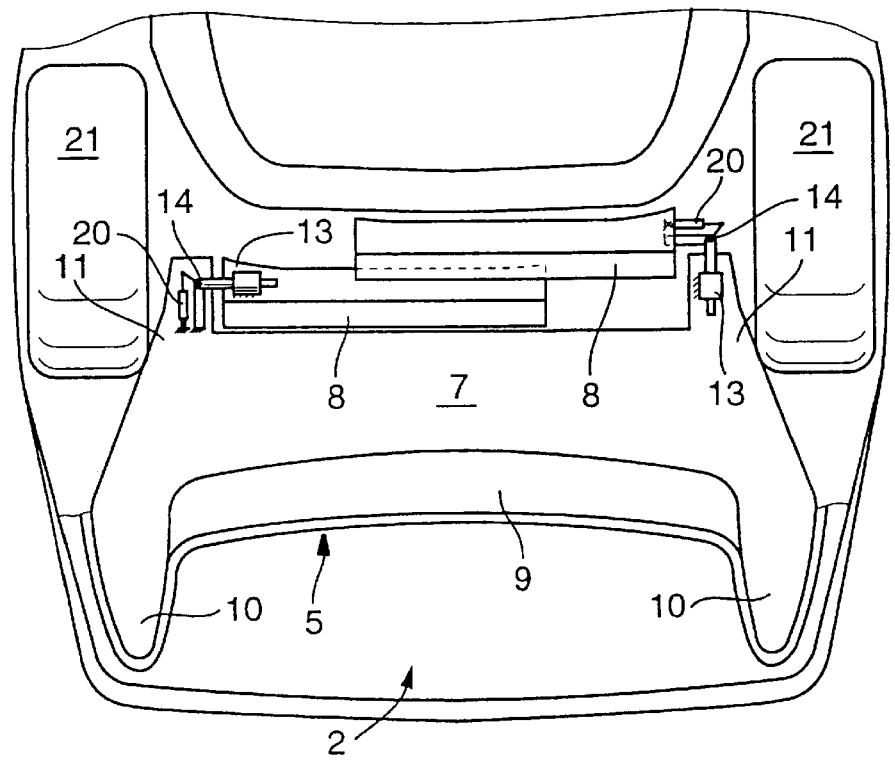
FIG. 11 is a top view of an opened rearward structure of the vehicle body of the passenger car of FIGS. 1 to 10, illustrating the arrangement of the vehicle roof within a depositing space in the rearward vehicle structure.

In FIG. 8, the axial length of the lamella roof parts in its largest packing density is almost identical with the axial length of the space between the column stubs 11 required for the folded-in roof frame parts 8. The number and thickness of the lamella roof parts and the width of the roof frame parts 8 are preferably correspondingly adapted to one another. For the swivelling-in of the roof frame parts 8 about their swivelling axes 14, a swivel cylinder 20 is assigned to each lifting/swivelling hinge as seen in FIG. 11. The lifting/swivelling hinges 13, 14, 20 are axially symmetrical and identically constructed, and are only installed inversely for the two opposite roof frame parts 8. As a result, the same structural shape can be used for the right and the left lifting/swivelling hinges.

Figure 2:
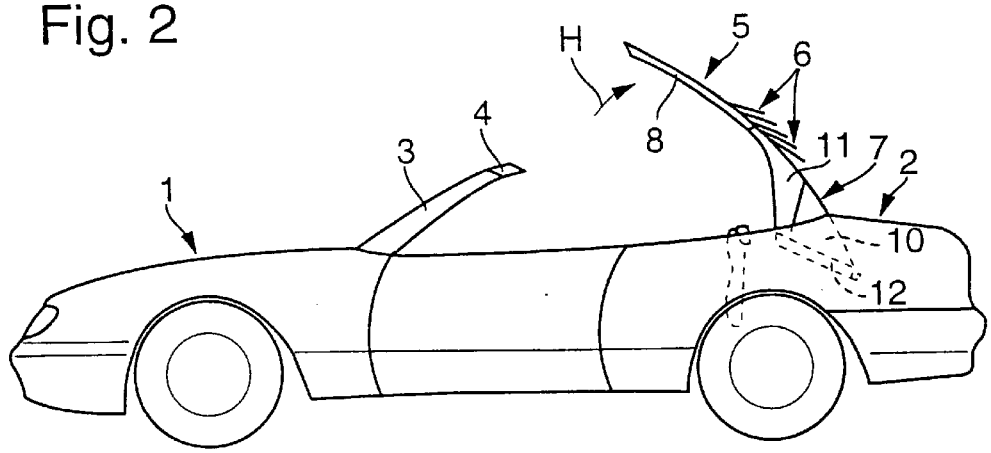
FIGS. 2 to 7 are lateral views of the passenger car of FIG. 1, in which the vehicle roof is changed into different opening positions.
Figure 3:
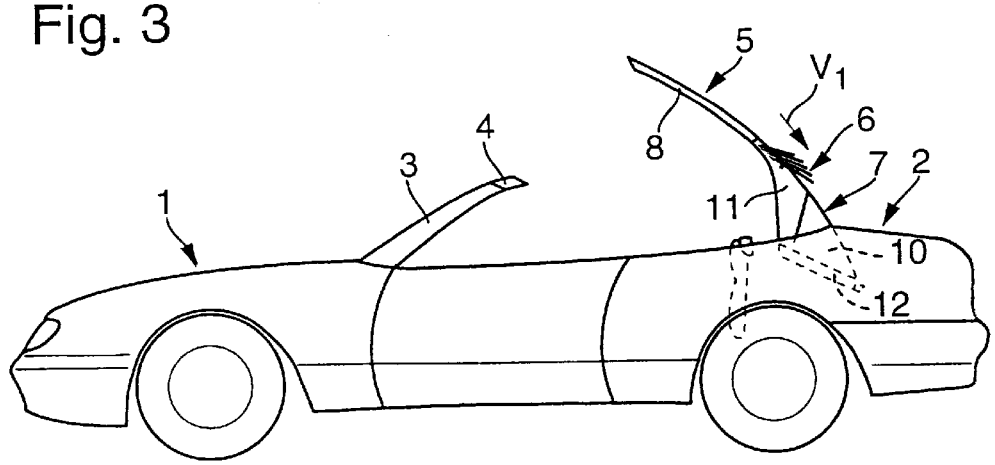

In order to now change the vehicle roof 5 from its closed position to its position lowered into the rearward vehicle structure 2, after a lowering of the side windows in the state shown in FIG. 2, the vehicle roof 5 is first raised (arrow H). The receiving opening covered by the covering area 12 is constructed to be so large and the kinematics of the movements are designed such that the entire vehicle roof 5 can be displaced through this receiving opening into the trunk of the rearward vehicle structure 2 without the requirement of opening an additional top compartment cover. It is also contemplated within the scope of the present invention that no plate-shaped covering area is provided which is connected with the vehicle roof 5. Instead of such a covering plate, a top compartment cover is disposed on the rearward vehicle structure 2 and must be opened up before the vehicle roof is raised. Otherwise, this construction corresponds to the illustrated embodiment.

Figure 4:
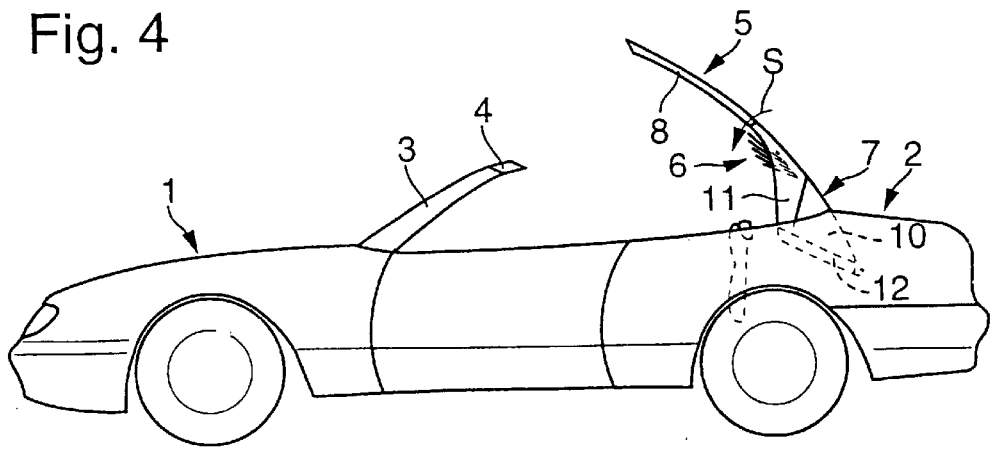
Figure 5:
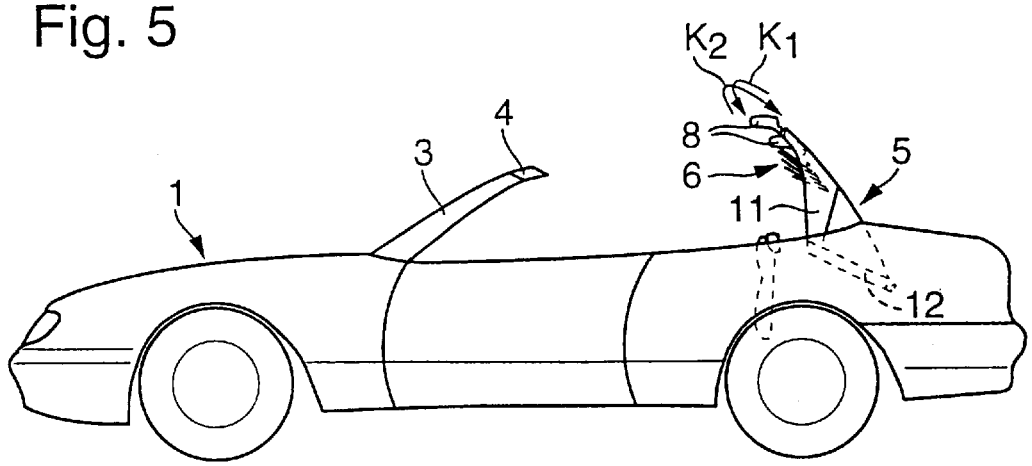
Figure 6:
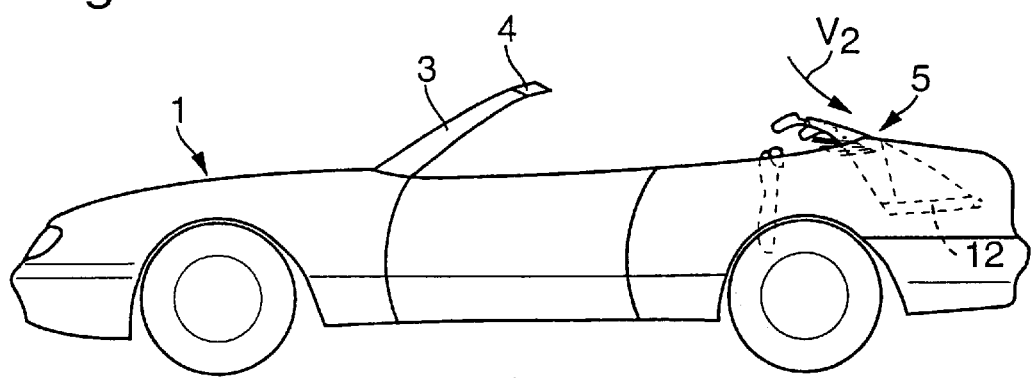
Figure 7:
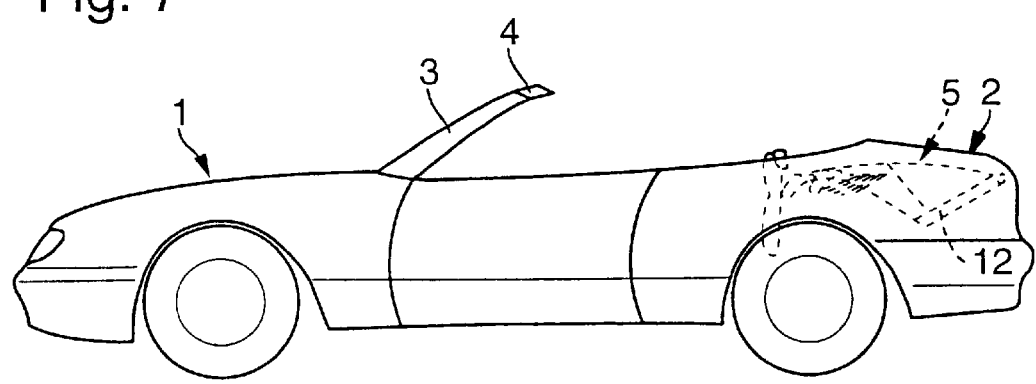

After the raising of the vehicle roof 5, the lamella roof 6 is completely opened up in that the lamella roof parts are moved back into their rearmost end position. After the releasing of the guide rail sections 19, the entire packet of the lamella roof parts is swivelled downward and rearwards in the direction of the arrow S and is locked below the rearward roof area as seen in FIG. 4. Now, the roof frame parts 8 are folded to the inside in the direction of the arrows $K_1$, $K_2$. The vehicle roof 5, which is folded together in such a compact manner, is now lowered in the direction of the arrow $V_2$ (FIG. 6) through the receiving opening into the trunk of the rearward vehicle structure 2 into the position seen in FIG. 7.

As illustrated in FIG. 11, the steep arrangement of the rear window 9 between the wing-type courses 10 of the C-columns creates a remaining free space in the trunk which provides a sufficiently large storage volume although the vehicle roof has been lowered into the trunk of the rearward vehicle structure 2 essentially in its operative position. The width of the vehicle roof 5 in the area of the C-columns 10, 11 and particularly in the area of the column stubs 11 is adapted such to the vehicle dimensions that the vehicle roof 5 can be positioned between rear-side wheel houses 21 of the vehicle body.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Passenger vehicle having a roof configured to be lowered into a rearward structure of a vehicle body and having a rearward roof area and two lateral roof frame parts which project from the rearward roof area in a longitudinal direction of the vehicle toward the front thereof and which flank and guide a lamella roof movable between an opened and a closed end position in the longitudinal direction of the vehicle, wherein the lamella roof has swivellable roof parts movable between a pushed-together opening position and a deposited position, each roof frame part is foldably connected by a hinge arrangement with the rearward roof area, and a securing device is operatively arranged to fix a respective end position associated with a first position of the roof frame parts in which the roof frame parts project toward the front as well as to a second position in which the roof frame parts are folded in.

2. The passenger vehicle according to claim 1, wherein the hinge arrangements of the roof frame parts are spaced from an outer contour of the lamella roof, which is moved into an opening position, on the rearward roof area such that, in a position folded in at a right angle with respect to a center of the roof, the roof frame parts are arranged parallel in front of an outer contour of the lamella roof.

3. The passenger vehicle according to claim 2, wherein each roof frame part is configured to be folded at a right angle toward the roof center, and the hinge arrangements of each of the roof frame parts are offset with respect to one another such that in the longitudinal direction of the vehicle the roof frame parts in their the second are positioned side-by-side in a transverse direction of the vehicle.

4. The passenger vehicle according to claim 1, wherein the rearward roof area has two C-columns which have a wing-like contour toward the rear in the longitudinal direction of the vehicle and transition at the beginning of the wing-like contour into cross members which are spaced above one another at least at approximately the same axial height and extend along a width of the vehicle roof so as to provide a frame for a steeply pitched rigid rear window.

5. The passenger vehicle according to claim 4, wherein the lamella roof parts of the lamella roof in the pushed-together, opening condition are swivellable about a swivel axis which extends horizontally and transversely to the longitudinal direction of the vehicle, toward the rear to the rearward roof area into the deposited position, and a detent for securing the lamella roof in the rearward roof area is assigned to the deposited position of the lamella roof.

6. The passenger vehicle according to claim 5, wherein the lamella roof includes a drive transmission unit having at least one coupling member which compensates the swivel movement of the lamella roof parts between the opened end position and the deposited position.

7. The passenger vehicle according to claim 6, wherein an elastically flexible tension pressure element constitutes the coupling member.

8. The passenger vehicle according to claim 1, wherein each hinge arrangement has axially symmetrically configured and installable lifting and swivelling hinges so as to be usable for the roof frame parts on either side of the vehicle.

* * * * *